(12) United States Patent
Unno et al.

(10) Patent No.: US 11,962,801 B2
(45) Date of Patent: Apr. 16, 2024

(54) IMAGE DECODING DEVICE, IMAGE DECODING METHOD, AND PROGRAM

(71) Applicant: KDDI CORPORATION, Tokyo (JP)

(72) Inventors: Kyohei Unno, Fujimino (JP); Yoshitaka Kidani, Fujimino (JP); Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 240 days.

(21) Appl. No.: 17/437,747

(22) PCT Filed: Mar. 2, 2020

(86) PCT No.: PCT/JP2020/008773
§ 371 (c)(1),
(2) Date: Sep. 9, 2021

(87) PCT Pub. No.: WO2020/184263
PCT Pub. Date: Sep. 17, 2020

(65) Prior Publication Data
US 2022/0167010 A1 May 26, 2022

(30) Foreign Application Priority Data
Mar. 11, 2019 (JP) ................. 2019-043971

(51) Int. Cl.
*H04N 19/593* (2014.01)
*H04N 19/105* (2014.01)
*H04N 19/159* (2014.01)
*H04N 19/176* (2014.01)
*H04N 19/182* (2014.01)

(52) U.S. Cl.
CPC ......... *H04N 19/593* (2014.11); *H04N 19/105* (2014.11); *H04N 19/159* (2014.11); *H04N 19/176* (2014.11); *H04N 19/182* (2014.11)

(58) Field of Classification Search
None
See application file for complete search history.

(56) References Cited

U.S. PATENT DOCUMENTS

2012/0044996 A1 2/2012 Sato
2021/0227208 A1* 7/2021 Lee ...................... H04N 19/593
(Continued)

FOREIGN PATENT DOCUMENTS

CN 113691809 A * 11/2021 ............. H04N 19/11
JP 2018-37936 A 3/2018
(Continued)

OTHER PUBLICATIONS

International Search Report issued in International Patent Application No. PCT/JP2020/008773 dated May 26, 2020.
(Continued)

*Primary Examiner* — Reza Aghevli
(74) *Attorney, Agent, or Firm* — Troutman Pepper Hamilton Sanders LLP

(57) ABSTRACT

An image decoding device includes: a prediction signal generation unit that generates a prediction signal by intra prediction, wherein in a block to which intra sub-partitions are applied, the prediction signal generation unit refers to a pixel of a decoded block adjacent to the block when generating prediction signals of all sub-blocks in the block.

3 Claims, 13 Drawing Sheets

(56) References Cited

U.S. PATENT DOCUMENTS

| | | | | |
|---|---|---|---|---|
| 2021/0306654 A1* | 9/2021 | Lee | ......................... | H04N 19/70 |
| 2021/0360240 A1* | 11/2021 | Lee | ....................... | H04N 19/159 |
| 2022/0053213 A1* | 2/2022 | Yoo | ......................... | H04N 19/11 |

FOREIGN PATENT DOCUMENTS

| | | | | |
|---|---|---|---|---|
| JP | 2018037936 A | * | 3/2018 | ............ H04N 19/119 |
| WO | WO-2018043256 A1 | * | 3/2018 | ............ H04N 19/119 |
| WO | WO-2020171673 A1 | * | 8/2020 | .............. H04N 19/70 |

OTHER PUBLICATIONS

De-Luxan-Hernandez, S., et al,. "CE3: Intra Sub-Partitions Coding Mode (Tests 1.1.1 and 1.1.2)" Joint Video Experts Team (JVET) of ITU-T SG 16 WP 3 and ISO/IEC JTC 1/SC 29/WG 11, JVET-M0102-v5, 11 pages (Jan. 2019) cited in ISR submitted herewith and cited in Specification.

De-Luxan-Hernandez, S., et al,. "CE3-related: Improvement on the Intra Sub-Partitions Coding Mode" Joint Video Experts Team (JVET) of ITU-T SG 16 WP 3 and ISO/IEC JTC 1/SC 29/WG 11, JVET-M0426-v1, 6 pages (Jan. 2019) cited in ISR submitted herewith.

Unno, K., et al., "Non-CE3: Relaxation method of processing dependency in ISP for small blocks" Joint Video Experts Team (JVET) of ITU-T SG 16 WP 3 and ISO/IEC JTC 1/SC 29/WG 11, JVET-N0159-v2, 8 pages (Mar. 2019) cited in ISR submitted herewith.

De-Luxan-Hernandez, S., et al,."Non-CE3: ISP with independent sub-partitions for certain block sizes" Joint Video Experts Team (JVET) of ITU-T SG 16 WP 3 and ISO/IEC JTC 1/SC 29/WG 11, JVET-N0372-v1, 10 pages (Mar. 2019) cited in ISR submitted herewith.

Bross, B., et al., "Versatile Video Coding (Draft 4)" Joint Video Experts Team (JVET) of ITU-T SG 16 WP 3 and ISO/IEC JTC 1/SC 29/WG 11, JVET-M1001-v6, 299 pages (Jan. 2019) cited in Specification.

Jie, J., et al., "Block-Based Parallel Intra Prediction Scheme for HEVC" Journal of Multimedia 7(4):,279-324, 51 pages submitted (Aug. 2012) cited in Specification.

Extended European Search Report dated Nov. 4, 2022, from corresponding EP Application No. 20769342.5.

* cited by examiner

IMAGE DECODING DEVICE, IMAGE DECODING METHOD, AND PROGRAM

CROSS REFERENCE TO RELATED APPLICATIONS

The present application is a U.S. National Phase Application under 35 U.S.C. § 371 of International Patent Application No. PCT/JP2020/008773 filed Mar. 2, 2020, which claims priority of Japanese Patent Application No. 2019-043971 filed Mar. 11, 2019. The entire contents of which are hereby incorporated by reference.

TECHNICAL FIELD

The present invention relates to an image decoding device, an image processing method, and a program.

BACKGROUND

Conventionally, there is known a technique called "Intra Sub-Partitions (ISP)" in which a block is divided into sub-blocks and intra prediction is sequentially performed for each sub-block (See, for example, Versatile Video Coding (Draft 4), JVET-M1001 and CE3:Intra Sub-Partitions Coding Mode (Tests 1.1.1 and 1.1.2), JVET-M0102).

SUMMARY OF INVENTION

However, in the conventional ISP, when intra prediction of a certain sub-block is performed, a decoded image of a sub-block processed immediately before in the same block is referred to. Therefore, the processing of each sub-block needs to be executed in series. In particular, there is a problem that such processing may become a bottleneck of a processing speed when implemented by hardware.

Therefore, the present invention has been made in view of the above-described problems, and an object thereof is to provide an image decoding device, an image decoding method, and a program capable of executing processing of each sub-block in parallel even in a block to which an ISP is applied.

The first aspect of the present invention is summarized as an image decoding device including: a prediction signal generation unit that generates a prediction signal by intra prediction, wherein in a block to which intra sub-partitions are applied, the prediction signal generation unit refers to a pixel of a decoded block adjacent to the block when generating prediction signals of all sub-blocks in the block.

The second aspect of the present invention is summarized as an image decoding device including: a prediction signal generation unit that generates a prediction signal by intra prediction, wherein in a block to which intra sub-partitions are applied, the prediction signal generation unit performs division of the block only when sizes of sub-blocks after division become equal to or larger than a minimum size of the block in a case where the division is not performed.

The third aspect of the present invention is summarized as an image decoding device including: an intra prediction mode decoding unit that decodes information related to intra prediction, wherein the intra prediction mode decoding unit omits decoding in a division direction of intra sub-partitions according to a shape of a block to which the intra sub-partitions are applied.

The fourth aspect of the present invention is summarized as an image decoding device including: an intra prediction mode decoding unit that constructs an MPM list in consideration of a shape of a sub-block after division in a block to which the intra sub-partitions are applied, and decodes an intra prediction mode using the MPM list.

The fifth aspect of the present invention is summarized as an image decoding device including: an intra prediction mode decoding unit that constructs an MPM list in consideration of a shape of a block before division in a block to which intra sub-partitions are applied, and decodes an intra prediction mode using the MPM list.

The sixth aspect of the present invention is summarized as an image decoding method including: generating a prediction signal by intra prediction, wherein in the generating, in a block to which intra sub-partitions are applied, a pixel of a decoded block adjacent to the block is referred to, when generating prediction signals of all sub-blocks in the block.

The seventh aspect of the present invention is summarized as a program used in an image decoding device, the program causing a computer to execute: generating a prediction signal by intra prediction, wherein in the generating, in a block to which intra sub-partitions are applied, a pixel of a decoded block adjacent to the block is referred to when generating prediction signals of all sub-blocks in the block.

According to the present invention, it is possible to provide an image decoding device, an image decoding method, and a program capable of executing processing of each sub-block in parallel even in a block to which an ISP is applied.

DETAILED DESCRIPTION

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
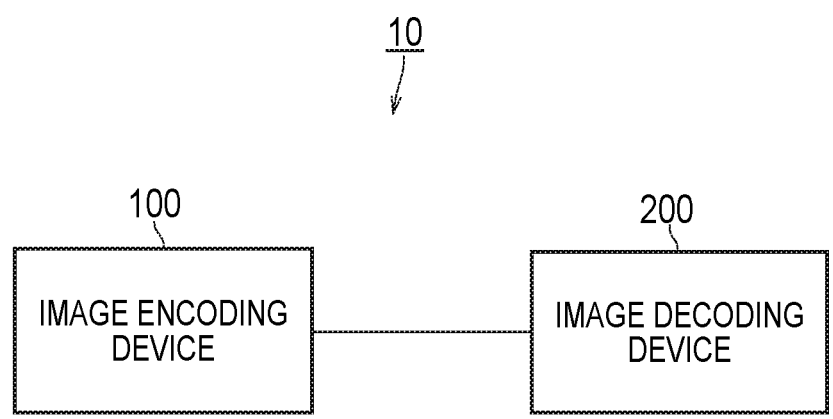
FIG. 1 is a diagram illustrating an example of a configuration of an image processing system 10 according to an embodiment.

An image processing system 10 according to a first embodiment of the present invention will be described hereinbelow with reference to FIGS. 1 to 13. FIG. 1 is a diagram illustrating the image processing system 10 according to an embodiment pertaining to the present embodiment.

As illustrated in FIG. 1, the image processing system 10 has an image encoding device 100 and an image decoding device 200.

The image encoding device 100 is configured to generate encoded data by encoding an input image signal. The image decoding device 200 is configured to generate an output image signal by decoding the encoded data.

Here, such encoded data may be transmitted from the image encoding device 100 to the image decoding device 200 via a transmission channel. The encoded data may also be stored on a storage medium and then provided to the image decoding device 200 from the image encoding device 100.

Figure 2:
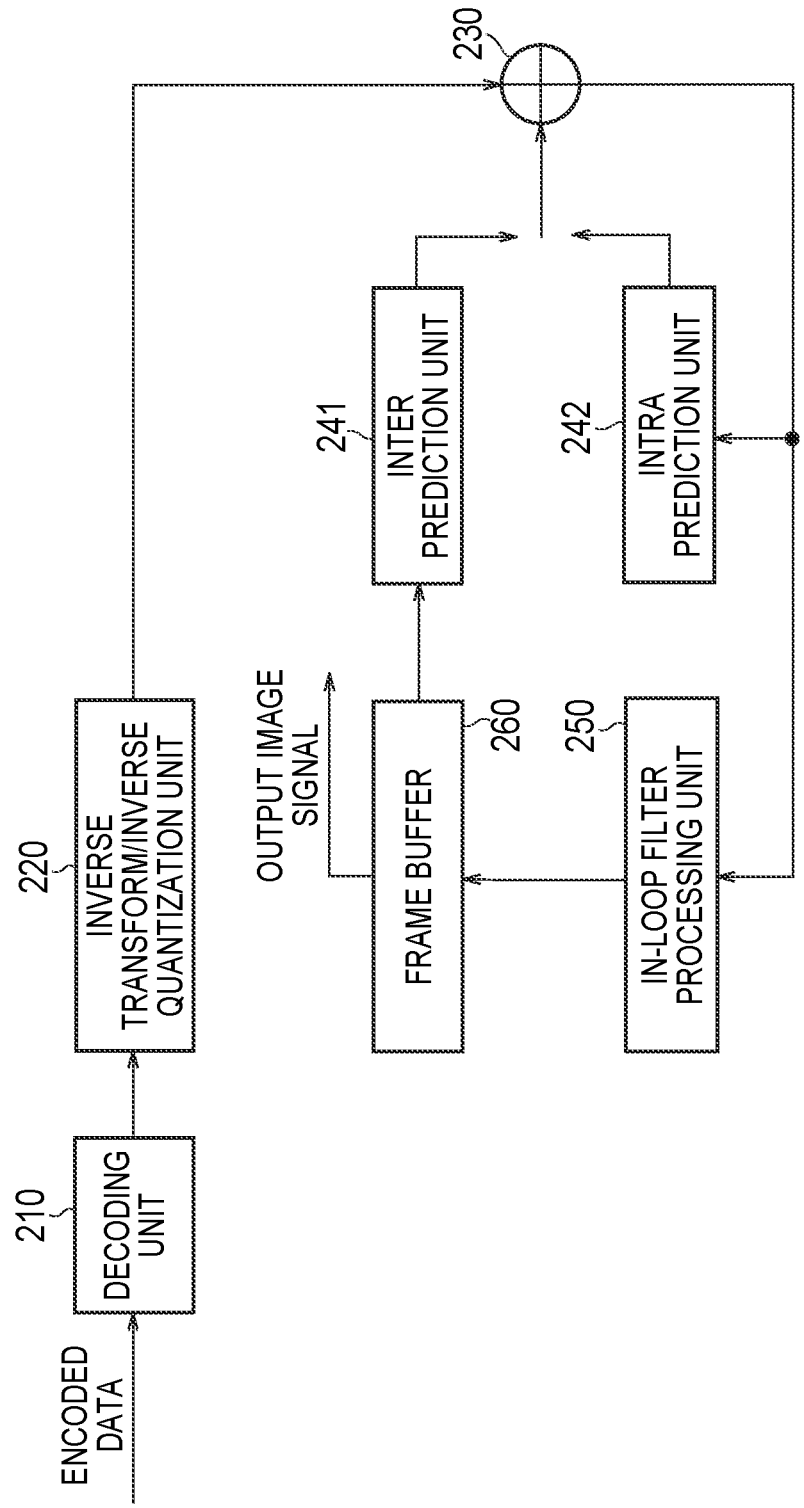
FIG. 2 is a diagram illustrating an example of functional blocks of an image decoding device 200 according to an embodiment.

An image decoding device 200 according to the present embodiment is described hereinbelow with reference to FIG. 2. FIG. 2 is a diagram illustrating an example of function blocks of the image decoding device 200 according to the present embodiment.

As illustrated in FIG. 2, the image decoding device 200 includes a decoding unit 210, an inverse transformation/inverse quantization unit 220, an adder 230, an inter-prediction unit 241, an intra-prediction unit 242, an in-loop filter processing unit 250, and a frame buffer 260.

The decoding unit 210 is configured to decode the encoded data generated by the image encoding device 100 and decode coefficient level values.

Here, for example, the decoding is decoding of data that is applied entropy encoding that assigns codes of different lengths based on the probability of occurrence of the coefficient level value.

The decoding unit 210 may also be configured to acquire control data through the processing to decode the encoded data.

Note that, the control data may contain size data such as the encoded block (CU: Coding Unit) size, the predictive block (PU: Prediction Unit) size, and the transform block (TU: Transform Unit) size.

The inverse transformation/inverse quantization unit 220 is configured to perform inverse transformation processing of the coefficient level values outputted from the decoding unit 210. Here, the inverse transformation/inverse quantization unit 220 may also be configured to perform inverse quantization of the coefficient level values prior to inverse transformation processing.

The adder 230 is configured to generate a pre-filtering decoding signal by adding the predictive signal to the predictive residual signal which is outputted from the inverse transformation/inverse quantization unit 220, and to output this pre-filtering decoding signal to the intra-prediction unit 242 and the in-loop filter processing unit 250.

Here, the pre-filtering decoding signal constitutes the reference block used by the intra-prediction unit 242.

The inter-prediction unit 241 is configured to generate a predictive signal by means of inter-prediction (prediction between frames).

More specifically, the inter-prediction unit 241 is configured to generate a predictive signal for each predictive block, on the basis of a reference signal that is contained in the motion vector decoded from the encoded data and the reference frame. The inter-prediction unit 241 is configured to output predictive signals to the adder 230.

The intra-prediction unit 242 is configured to generate a predictive signal by means of intra-prediction (prediction within a frame).

More specifically, the intra-prediction unit 242 is configured to specify a reference block that is contained in a target frame and to generate, on the basis of the specified reference block, a predictive signal for each predictive block. The intra-prediction unit 242 is configured to output predictive signals to the adder 230.

The in-loop filter processing unit 250 is configured to perform filter processing on a pre-filtering decoding signal which is outputted from the adder 230 and to output a post-filtering decoding signal to the frame buffer 260.

Here, for example, the filter processing is deblocking filter processing that reduces distortions that occur at the boundaries of blocks (encoded blocks, predictive blocks, transform blocks, or subblocks obtained by dividing such blocks).

The frame buffer 260 is configured to store a reference frame which is used by the inter-prediction unit 241.

Here, the post-filtering decoding signal constitutes the reference frame used by the inter-prediction unit 241.

Figure 3:
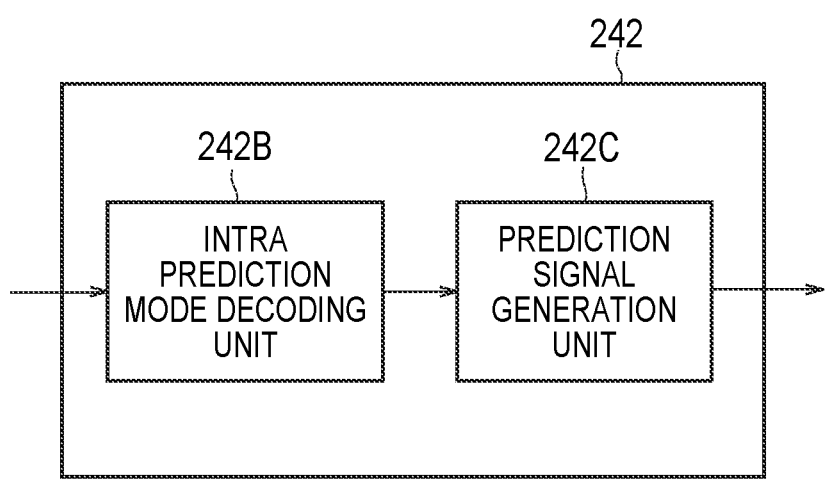
FIG. 3 is a diagram illustrating an example of functional blocks of an intra prediction unit 242 of the image decoding device 200 according to an embodiment.

Hereinafter, the intra prediction unit 242 according to the present embodiment will be described with reference to FIG. 3. FIG. 3 is a diagram illustrating an example of functional blocks of the intra prediction unit 242 of the image decoding device 200 according to the present embodiment.

As illustrated in FIG. 3, the intra prediction unit 242 has an intra prediction mode decoding unit 242B and a prediction signal generation unit 242C.

The intra prediction unit 242 is an example of a prediction unit configured to generate a prediction signal by intra prediction (intra-frame prediction).

The intra prediction mode decoding unit 242B decodes information necessary for performing intra prediction for each block.

Figure 4:
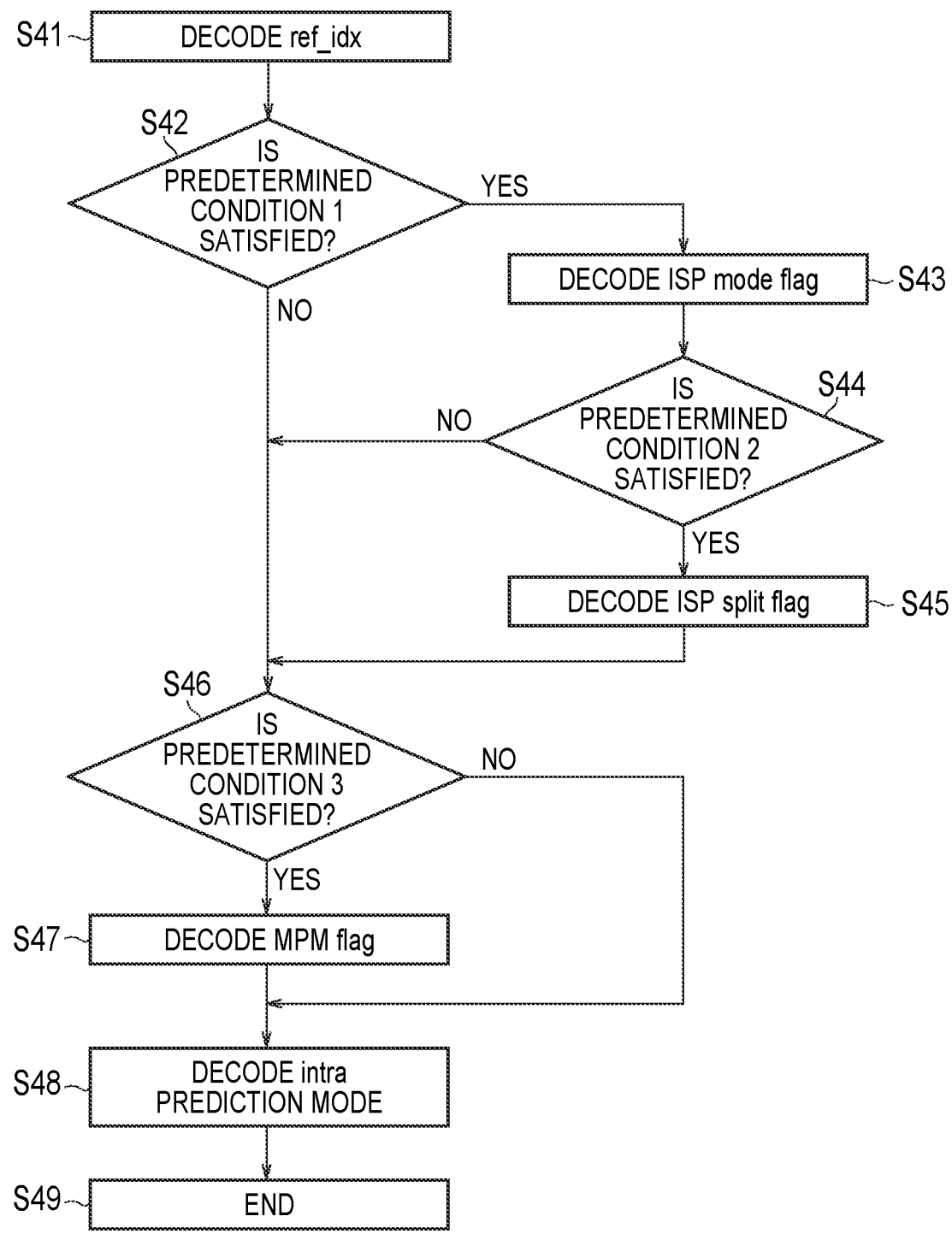
FIG. 4 is a flowchart illustrating an example of a processing procedure of an intra prediction mode decoding unit 242B of an intra prediction unit 242 of the image decoding device 200 according to an embodiment.

FIG. 4 is a flowchart illustrating an example of a processing procedure of the intra prediction mode decoding unit 242B. Hereinafter, an example of a processing procedure of the intra prediction mode decoding unit 242B will be described using such a flowchart.

As illustrated in FIG. 4, in step S41, the intra prediction mode decoding unit 242B decodes information (ref_idx) related to a pixel position to be referred to when intra prediction is performed. A possible value of "ref_idx" is any one of "0", "1", and "2".

In the case of "ref_idx=0", the intra prediction mode decoding unit 242B performs intra prediction by referring to a pixel value located at a block boundary with a block currently being processed (hereinafter, a processing target block) among pixels of a decoded block adjacent to the processing target block.

In the case of "ref_idx=1", the intra prediction mode decoding unit 242B performs intra prediction with reference to a pixel one row or one column away from a pixel located at the above-described block boundary.

In the case of "ref_idx=2", the intra prediction mode decoding unit 242B performs intra prediction with reference to a pixel three rows or three columns away from a pixel located at the above-described block boundary.

In step S42, the intra prediction mode decoding unit 242B determines whether a predetermined condition 1 is satisfied.

Here, the predetermined condition 1 may include a condition that the value of "ref_idx" is "0". Furthermore, the predetermined condition 1 may include a condition that the size of the processing target block (the number of pixels included in the block) is equal to or larger than a predetermined number of pixels. The number of pixels can be set to thirty two pixels, for example. In addition, the predetermined condition 1 may include a condition that the size (number of pixels) of the processing target block in a vertical direction is eight pixels or more. Further, the predetermined condition 1 may include a condition that the size of the processing target block in a horizontal direction is eight pixels or more.

In a case where the predetermined condition 1 is satisfied, the present processing proceeds to step S43, and in a case where the predetermined condition 1 is not satisfied, the present processing proceeds to step S46.

In step S43, the intra prediction mode decoding unit 242B decodes an "ISP mode flag".

The intra prediction mode decoding unit 242B does not apply the ISP to the processing target block when "ISP mode flag=0", and applies the ISP to the processing target block when "ISP mode flag=1".

In step S44, the intra prediction mode decoding unit 242B determines whether a predetermined condition 2 is satisfied. When the predetermined condition 2 is satisfied, the process proceeds to step S45, and when the predetermined condition 2 is not satisfied, the process proceeds to step S46.

Here, the predetermined condition 2 may include a condition that the value of the "ISP mode flag" is "1". Further, the predetermined condition 2 may include a condition that the shape of the processing target block is not horizontally long or vertically long.

Note that "horizontally long" can be defined as, for example, that the size (the number of pixels) of the processing target block in the horizontal direction is twice or more the size (the number of pixels) in the vertical direction. Similarly, "vertically long" can be defined as, for example, that the size of the processing target block in the vertical direction is twice or more the size in the horizontal direction.

Furthermore, for example, "horizontally long" can be defined as that the size of the processing target block in the horizontal direction is larger than the size in the vertical direction, and "vertically long" can be defined as that the size of the processing target block in the vertical direction is larger than the size in the horizontal direction.

In a case where the predetermined condition 2 includes the above-described condition, the intra prediction mode decoding unit 242B omits decoding of the "ISP split flag" in step S45 for a block determined to be horizontally long or vertically long. In such a case, the intra prediction mode decoding unit 242B can determine a division direction of the ISP according to the shape of a block such that a horizontally long block is horizontally divided and a vertically long block is vertically divided.

In step S45, the intra prediction mode decoding unit 242B decodes the "ISP split flag".

Here, when "ISP split flag=0", it indicates that the division direction in the ISP is the horizontal direction (that is, horizontal division), and when "ISP split flag=1", it indicates that the division direction in the ISP is the vertical direction (that is, vertical division).

The ISP is a technique of dividing a processing target block into a plurality of sub-blocks and performing intra prediction and generation of a decoded image for each sub-block.

Figure 5:
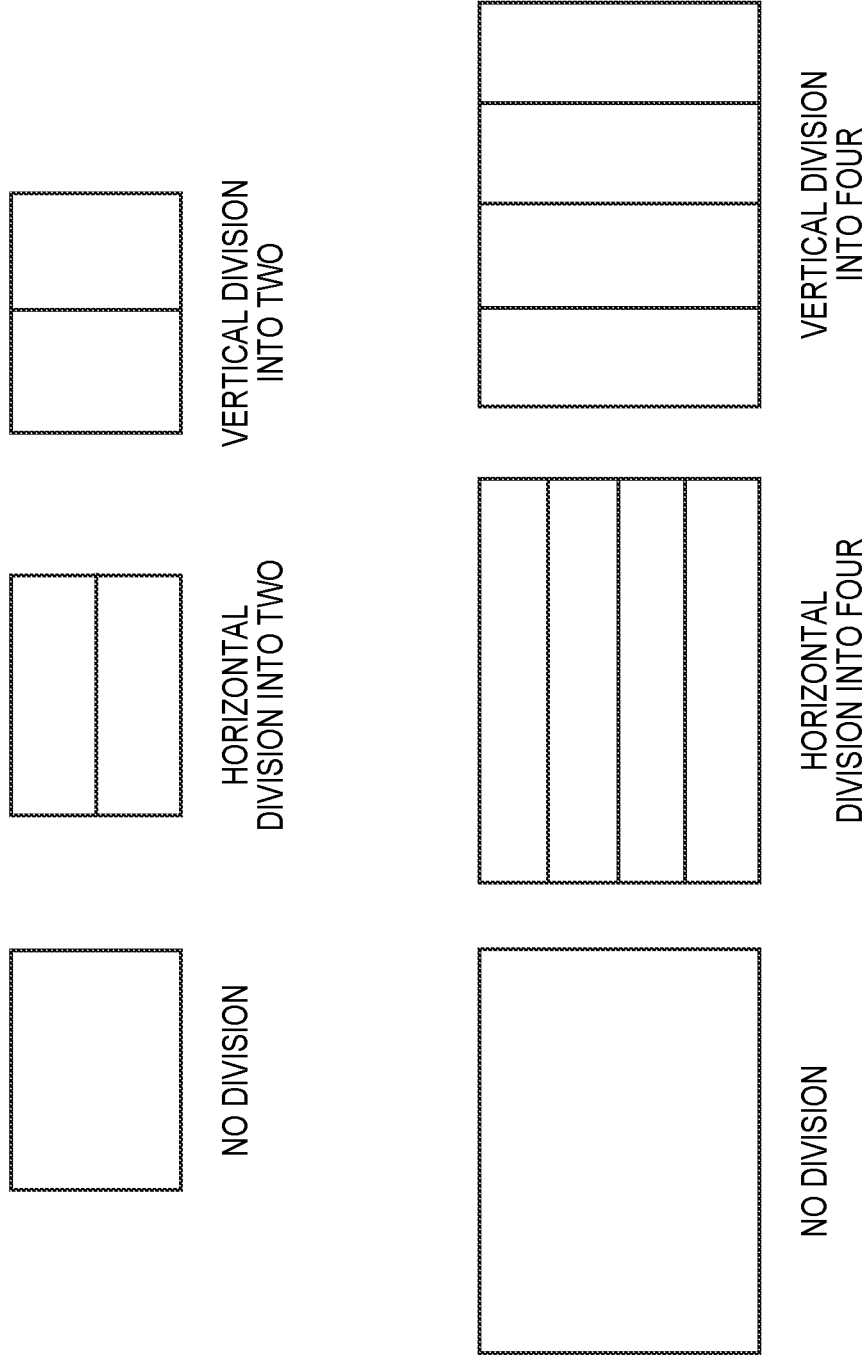
FIG. 5 is a diagram illustrating an example of a division method into sub-blocks used in an embodiment.

FIG. 5 illustrates an example of such a division method. As illustrated in FIG. 5, in the present embodiment, in the case of horizontal division, the processing target block is divided into sub-blocks in which the number of pixels in the horizontal direction is the same as that before the division and the number of pixels in the vertical direction is ½ or ¼ of that before the division (horizontal division into two or horizontal division into four). Similarly, in the case of vertical division, the processing target block is divided into sub-blocks in which the number of pixels in the vertical direction is the same as that before the division and the number of pixels in the horizontal direction is ½ or ¼ of that before the division (vertical division into two or vertical division into four).

Figure 6:
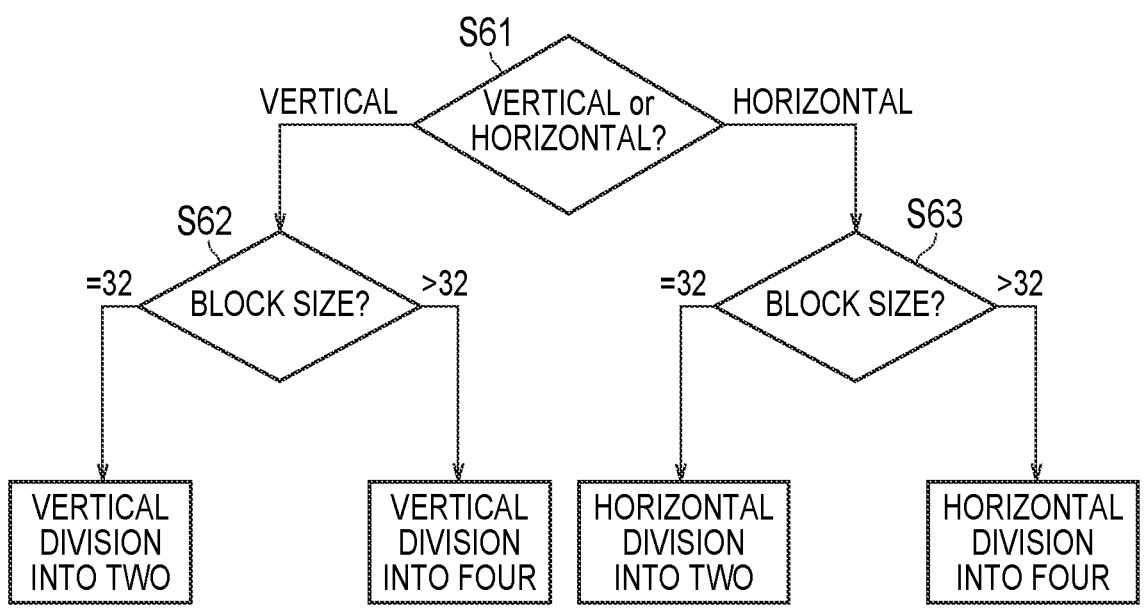
FIG. 6 is a flowchart illustrating an example of a procedure for determining a division direction and the number of divisions in ISP used in an embodiment.

Here, a procedure for determining a division direction and the number of divisions in the ISP used in the present embodiment will be described with reference to FIG. 6. FIG. 6 is a flowchart illustrating an example of a procedure for determining a division direction and the number of divisions in the ISP used in the present embodiment.

As illustrated in FIG. 6, in step S61, on the basis of the "ISP split flag" decoded in step S45, the procedure proceeds to step S62 in the case of vertical division, and the procedure proceeds to step S63 in the case of horizontal division.

In step S62, the block size of the processing target block is determined. Here, for example, the block size can be defined as the number of pixels in the block.

In a case where a condition that the size of the processing target block is thirty two pixels or more is included in the predetermined condition 1, the number of divisions in the ISP can be determined in step S62, for example, in a case where the block size is thirty two pixels, "vertical division into two" is determined, and in a case where the block size is larger than thirty two pixels, "vertical division into four" is determined.

Similarly, in step S63, the number of divisions in the ISP can be determined, for example, "horizontal division into two" in a case where the block size is thirty two pixels, and "horizontal division into four" in a case where the block size is larger than thirty two pixels.

Figure 7:
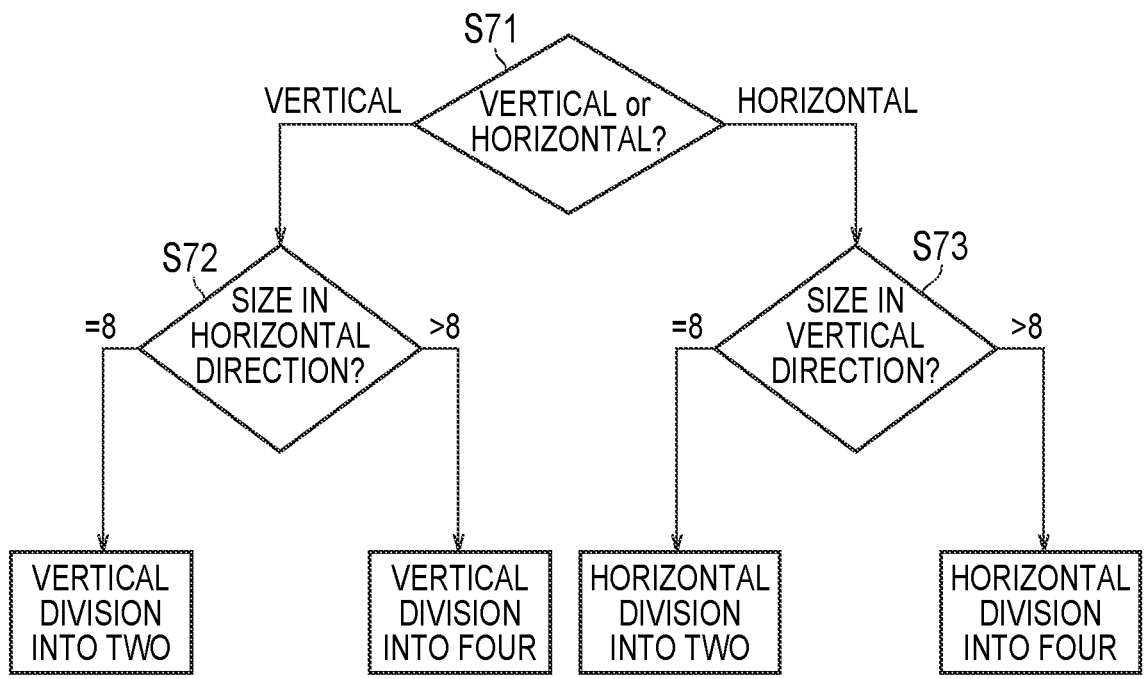
FIG. 7 is a flowchart illustrating an example of a procedure for determining a division direction and the number of divisions in ISP used in an embodiment.

In addition, the division direction and the number of divisions in the ISP can be determined by a procedure illustrated in FIG. 7. Note that FIG. 7 illustrates an example of a determination procedure in a case where the predetermined condition 1 includes both a condition that the size of the processing target block in the vertical direction is eight pixels or more and a condition that the size of the processing target block in the horizontal direction is eight pixels or more.

As illustrated in FIG. 7, in step S71, similarly to step S61, in the case of the vertical division, the procedure proceeds to step S72, and in the case of the horizontal division, the procedure proceeds to step S73.

In step S72, the number of divisions in the ISP can be determined, such as "vertical division into two" when the size of the processing target block in the horizontal direction is eight pixels, and "vertical division into four" when the size of the processing target block in the horizontal direction is larger than eight pixels.

Here, in a case where only the size of the number of pixels to the power of 2 is defined as the size of the block in the horizontal direction and the vertical direction, a case where the size is larger than eight pixels is equivalent to a case where the size is sixteen pixels or more.

Similarly, in step S73, the number of divisions in the ISP can be determined, for example, "horizontal division into two" when the size of the processing target block in the vertical direction is eight pixels, and "horizontal division into four" when the size of the processing target block in the vertical direction is larger than eight pixels.

By adopting the procedure illustrated in FIG. 7, it is possible to perform the division such that the size of the sub-block after the division in the horizontal direction and the vertical direction is always four pixels or more. In addition, when the minimum value of the sizes in the horizontal direction and the vertical direction in the case of not using the ISP is set to four pixels, it is guaranteed that the size of the sub-block is equal to or larger than the minimum size in the case of not using the ISP (the minimum size of the block in the case of not dividing) by performing the above-described processing. As a result, the processing complexity when the ISP is used can be suppressed to be less than or equal to the processing complexity when the ISP is not used.

Note that the procedure illustrated in FIG. 7 is merely an example, and a similar effect can be obtained as long as the division method is such that the size of the sub-block after the division is always equal to or larger than the minimum size in a case where the block is not divided.

As described above, after the intra prediction mode decoding unit 242B decodes the "ISP split flag" indicating the division direction of the ISP, the present processing proceeds to step S46.

In step S46, the intra prediction mode decoding unit 242B determines whether a predetermined condition 3 is satisfied.

Here, the predetermined condition 3 may include a condition that the value of the "ISP mode flag" is "0". Note that, in a case where the intra prediction mode decoding unit 242B does not decode the "ISP mode flag", a value of the "ISP mode flag" can be regarded as "0".

When the predetermined condition 3 is satisfied, the process proceeds to step S47, and when the predetermined condition 3 is not satisfied, the process proceeds to step S48.

In step S47, the intra prediction mode decoding unit 242B decodes an "MPM flag".

Here, in a case where "MPM flag=1", it means that the intra prediction mode of the processing target block is one of prediction modes existing in an MPM list described later.

On the other hand, in a case where "MPM flag=0", it means that a prediction mode not present in the MPM list is applied to the processing target block.

When the "MPM flag" is not decoded, that is, when the predetermined condition 3 is not satisfied, for example, the intra prediction mode decoding unit 242B can consider that a value of the "MPM flag" is "1".

In step S48, the intra prediction mode decoding unit 242B decodes the intra prediction mode based on the information decoded so far. Examples of the intra prediction mode include a DC mode, a Planar mode, a directivity prediction mode, and the like as described in Versatile Video Coding (Draft 4), JVET-M1001.

In order to decode the intra prediction mode, the intra prediction mode decoding unit 242B first creates an MPM list. As a method of creating the MPM list, a known method as disclosed in Versatile Video Coding (Draft 4), JVET-M1001 can be used. In addition, the method of creating the MPM list may be switched according to the value of the "ISP mode flag" described above.

Figure 8:
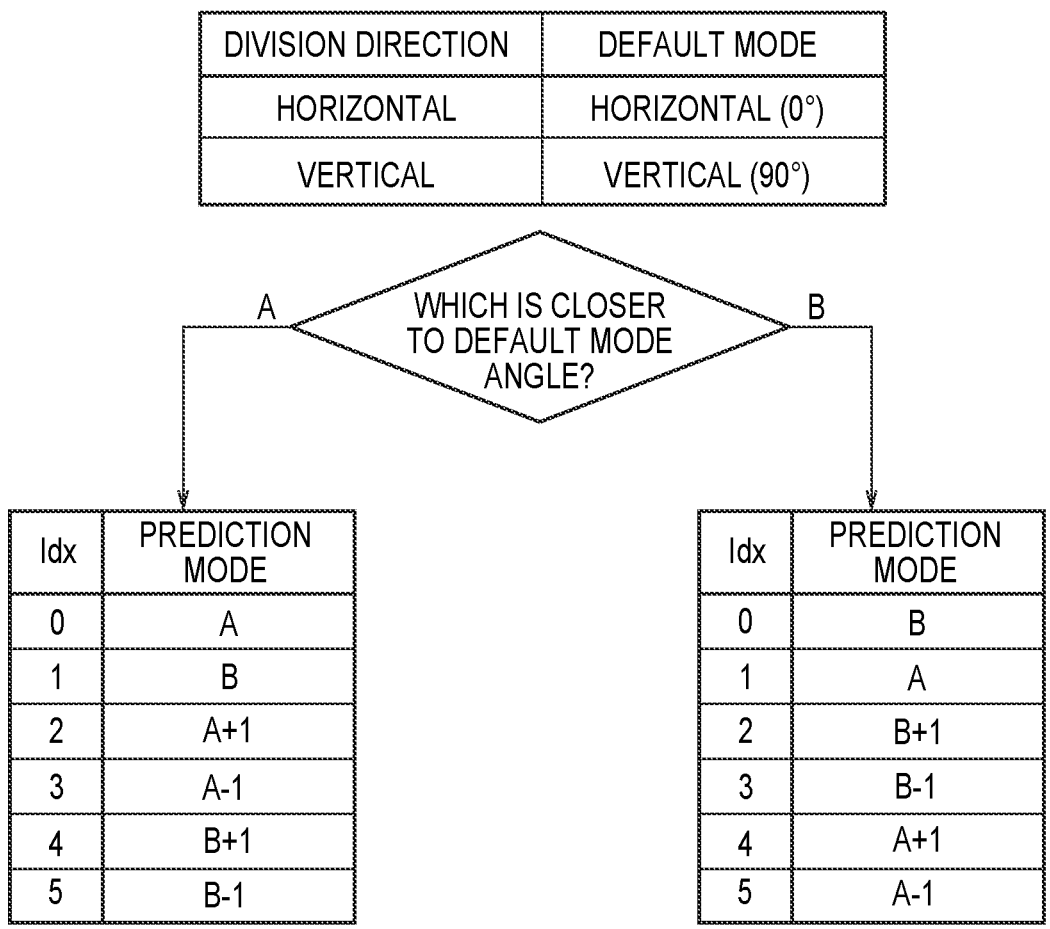
FIG. 8 is a flowchart illustrating an example of a method of constructing an MPM list used in an embodiment.

FIG. 8 is a flowchart illustrating an example of a method of creating an MPM list in a case where a value of the "ISP mode flag" is "1". As illustrated in FIG. 8, a default mode corresponding to the division direction is defined in advance.

Next, the intra prediction mode decoding unit 242B constructs the MPM list by using the intra prediction modes used in two blocks that are decoded blocks A and B adjacent to the processing target block.

Here, the decoded block A is an adjacent block on an upper side of the processing target block, and the decoded block B is an adjacent block on a left side of the processing target block. As a strict method for determining the decoded blocks A and B, a method described in Versatile Video Coding (Draft 4), JVET-M1001 can be used.

FIG. 8 is an example of a construction procedure of the MPM list in a case where the intra prediction modes used in the decoded blocks A and B are both directivity prediction and the prediction directions are different.

In a case where the prediction direction used in the decoded block A has a smaller angle difference from the default mode than the prediction direction used in the decoded block B, the intra prediction mode decoding unit 242B sets the prediction mode used in the decoded block A at the 0th in the MPM list, and sets the prediction mode used in the decoded block B at the first in the MPM list.

Thereafter, the intra prediction mode decoding unit 242B sets prediction modes having slightly different angles from the prediction mode of the decoded block A at the second and third in the MPM list, and sets prediction modes having slightly different angles from the prediction mode of the decoded block B at the fourth and fifth in the MPM list.

Here, A and B in FIG. 8 are defined by numerical values corresponding to the angle in the prediction direction, and the angle increases as the numerical value increases, and the angle decreases as the numerical value decreases.

Similarly, in a case where the prediction direction used in the decoded block B has a smaller angle difference from the default mode than the prediction direction used in the decoded block A, the intra prediction mode decoding unit 242B sets the prediction mode used in the decoded block B at the 0th in the MPM list and sets the prediction mode used in the decoded block A at the first in the MPM list.

Thereafter, the intra prediction mode decoding unit 242B sets prediction modes having slightly different angles from the prediction mode of the decoded block B at the second and third in the MPM list, and sets prediction modes having slightly different angles from the prediction mode of the decoded block A at the fourth and fifth in the MPM list.

In the case that a code word is allocated such that the prediction mode in which the value of an index (Idx) of the MPM list is small can be coded with a smaller amount of code, by setting the index of a mode with a small angle difference from the default mode to be small in this way, the prediction mode in the prediction direction suitable for the division direction can be expressed with a smaller amount of code, so that the coding efficiency is improved.

Note that the method of constructing the MPM list described here is merely an example. A similar effect can be obtained by a method of constructing an MPM list in which the index of a mode considered to be more appropriate becomes small in consideration of the division direction.

Figure 9:
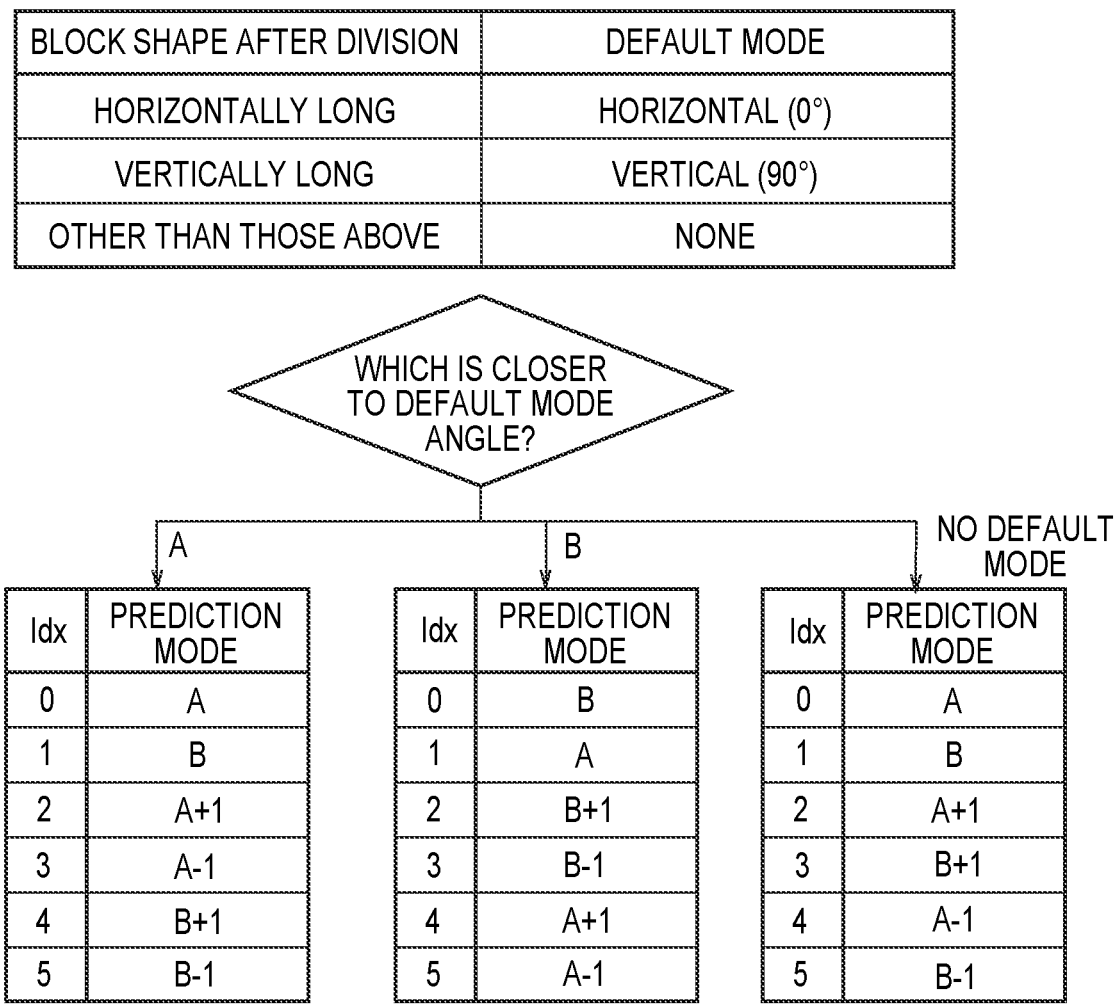
FIG. 9 is a flowchart illustrating an example of a method of constructing an MPM list used in an embodiment.

In the example of FIG. 8, the setting of the default mode is defined by the division method of the ISP, but as illustrated in an example of FIG. 9, the setting of the default mode can also be defined based on the shape of a sub-block after the division.

As illustrated in FIG. 9, the default mode can be defined depending on whether the shape of the sub-block after the division is horizontally long, vertically long, or any other shape, and a method of constructing the MPM list can be switched depending on the default mode.

Here, horizontally long can be defined as, for example, that the size (the number of pixels) of the processing target block in the horizontal direction is twice or more the size (the number of pixels) in the vertical direction. Similarly, vertically long can be defined as, for example, that the size of the processing target block in the vertical direction is twice or more the size in the horizontal direction.

Further, for example, horizontally long can be defined as that the size of the processing target block in the horizontal direction is larger than the size in the vertical direction, and vertically long can be defined as that the size of the processing target block in the vertical direction is larger than the size in the horizontal direction.

At this time, by including a case where the sizes in the horizontal direction and the vertical direction are equal to each other in either vertically long or horizontally long, the default mode can be defined in two patterns as in the example of FIG. 7.

In addition, in FIG. 9, the default mode is defined on the basis of the block shape after the division. However, even in a case where the default mode is defined using the block shape before the division, similar processing can be performed.

As described above, after the intra prediction mode decoding unit 242B decodes the "MPM flag", the present processing proceeds to step S48.

In a case where "MPM flag=1" is satisfied in step S48, the intra prediction mode decoding unit 242B decodes the index of the prediction mode to be used in the processing target block, and determines the prediction mode corresponding to the decoded index in the constructed MPM list as the prediction mode of the processing target block as described above.

On the other hand, in a case where "MPM flag=0" is satisfied in step S48, the intra prediction mode decoding unit 242B decodes information indicating which prediction mode to use among the prediction modes not included in the above-described MPM list, and determines the decoded prediction mode as the prediction mode of the processing target block.

Since the prediction mode used in the processing target block can be decoded by the above procedure, the process proceeds to step S49 and ends.

The prediction signal generation unit 242C illustrated in FIG. 3 is configured to generate the prediction signal based on the prediction mode of the processing target block decoded by the intra prediction mode decoding unit 242B. Here, as a method of generating the prediction signal, for example, a known method described in Versatile Video Coding (Draft 4), JVET-M1001 can be used.

Figure 10:
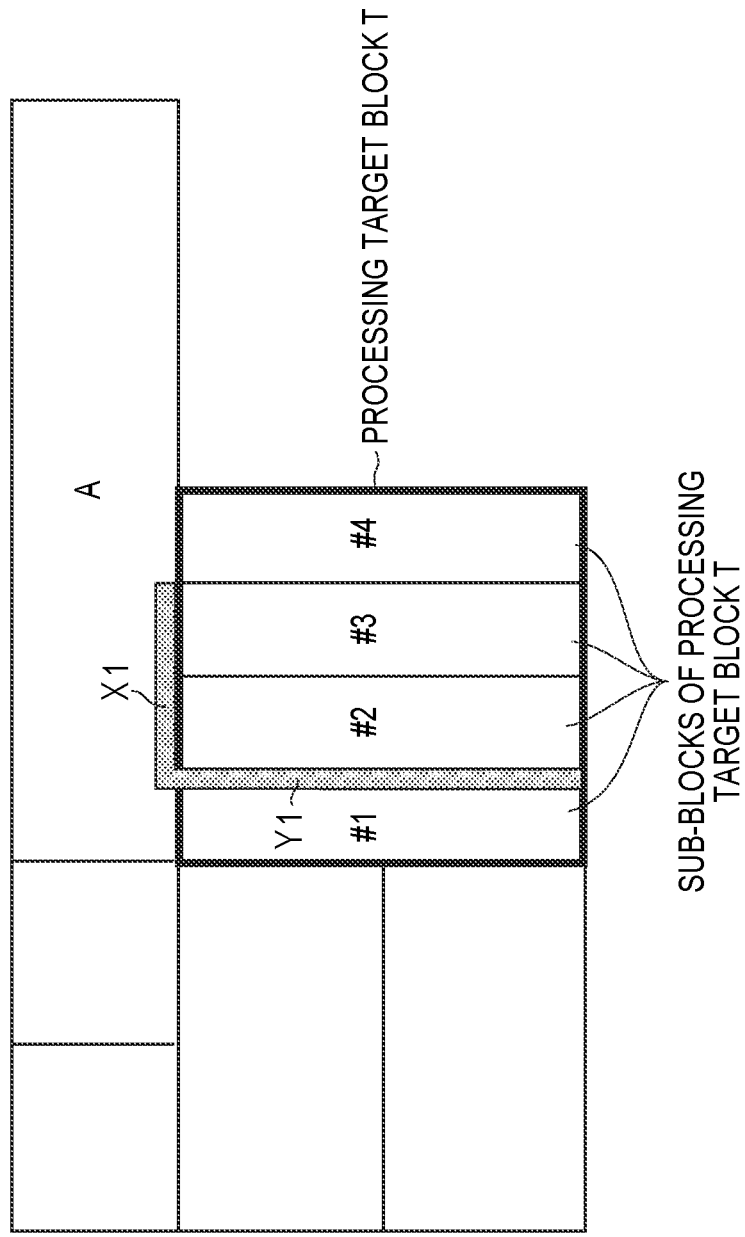
FIG. 10 illustrates an arrangement of reference pixels at the time of intra prediction in a case where vertical division into four is applied in the ISP in an embodiment.

FIG. 10 illustrates an example of an arrangement of reference pixels at the time of intra prediction in a case where vertical division into four is applied in the ISP.

In the ISP, when a block T is divided in the vertical direction (when the vertical division is performed), the prediction processing and the decoded image generation processing are sequentially performed from a sub-block #1 on a left side.

As illustrated in FIG. 10, in the case that the intra prediction is performed on a sub-block #2 that is second from the left, a pixel X1 of a decoded block A adjacent to an upper side of the sub-block #2 and a decoded pixel Y1 of the sub-block #1 adjacent to a left side of the sub-block #2 are referred to.

The arrangement of the reference pixels illustrated in FIG. 10 is merely an example. For example, when intra prediction is performed on the sub-block #2 in the vertical division, pixels other than the pixel Y1 in the arrangement illustrated in FIG. 10 may be referred to as decoded pixels in the sub-block #1.

Similarly, in the ISP, when a block is divided in the horizontal direction (when the horizontal division is performed), the prediction processing and the decoded image generation processing are sequentially performed from an upper sub-block.

Figure 11:
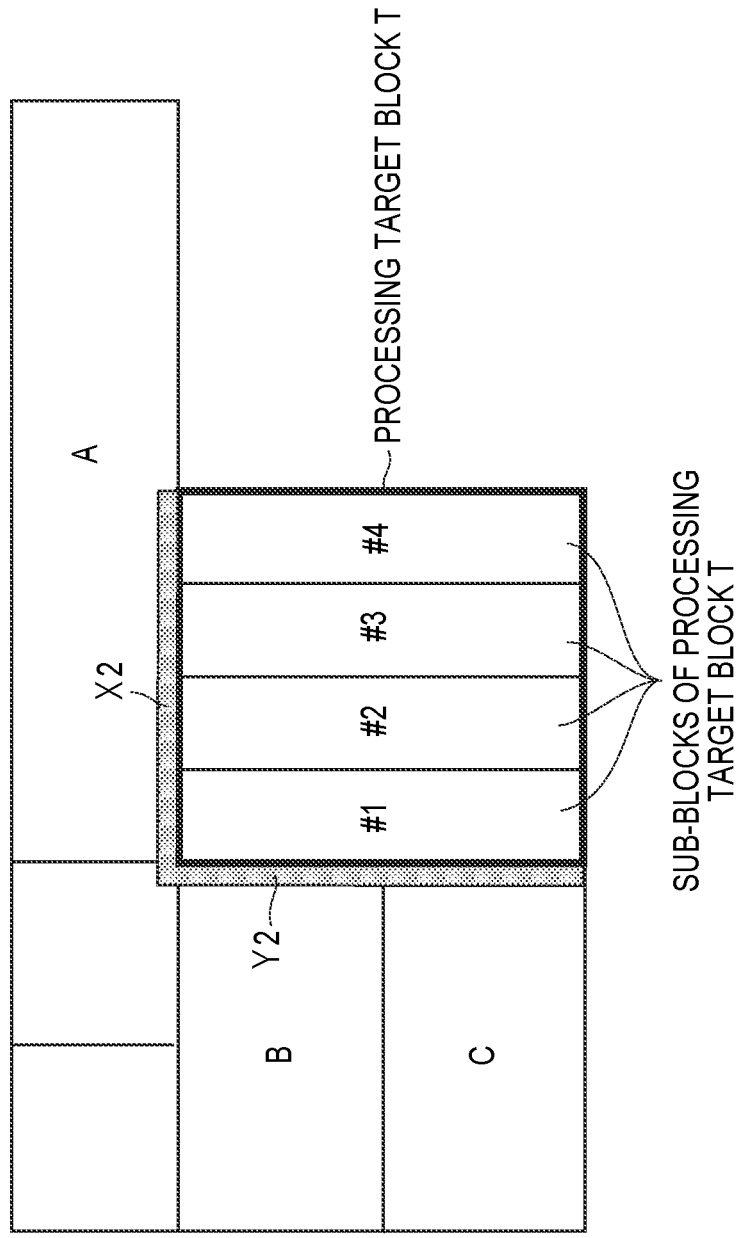
FIG. 11 illustrates an example of an arrangement of reference pixels at the time of intra prediction in a case where vertical division into four is applied in the ISP in an embodiment.

Here, the positions of the reference pixels in a case where intra prediction is performed for each of the sub-blocks #1 to #4 can be, for example, as illustrated in FIG. 11, a pixel X2 of the decoded block A adjacent to an upper side of the sub-blocks #1 to #4 (block T) and a pixel Y2 of the decoded blocks B/C adjacent to a left side of the sub-blocks #1 to #4 (block T).

That is, the decoded pixels of the sub-blocks #1 to #3 in the processing target block T may not be referred to in the intra prediction for the second and subsequent sub-blocks #2 to #4.

The pixel arrangement illustrated in FIG. 11 is merely an example. Pixels other than the pixels X2/Y2 in the arrangement illustrated in FIG. 11 may be referred to as long as the pixels are pixels of the decoded blocks adjacent to the processing target block T.

FIG. 11 illustrates an example of a case where vertical division is performed, but a similar arrangement of reference pixels can be adopted in a case where horizontal division is performed. In this way, by not referring to the decoded pixels in the blocks, the prediction processing and the decoded image generation processing of each sub-block can be executed in parallel.

In the present embodiment, the prediction modes of the sub-blocks in the same block are common. Therefore, the generation processing of the prediction signal in the case of the arrangement of the reference pixels illustrated in FIG. 11 can be the same as the normal generation processing of the intra prediction without dividing the processing target block T into sub-blocks.

Therefore, by adopting the arrangement of the reference pixels illustrated in FIG. 11, it is also possible to implement a configuration in which the generation processing of the prediction signal is executed in units of blocks regardless of the suitability of the ISP. Furthermore, in such a case, the generation processing of the decoded image in the block to which the ISP has been applied (the generation processing of the decoded signal before filter processing) can be executed in parallel for each sub-block.

Furthermore, the arrangement of the reference pixels described above can be switched depending on the block size. For example, the arrangement of the reference pixels can be switched depending on whether or not the width and height of the sub-block are less than predetermined threshold values.

For example, as illustrated in FIG. 6, in a case where the width of the sub-block is less than four pixels, the reference pixels illustrated in FIG. 11 can be arranged, and in a case where the width of the sub-block is four pixels or more, the reference pixels illustrated in FIG. 10 can be arranged.

Similarly, for example, in a case where the height of the sub-block is less than four pixels, the reference pixels illustrated in FIG. 11 can be arranged, and in a case where the height of the sub-block is four pixels or more, the reference pixels illustrated in FIG. 10 can be arranged.

That is, for example, in a case where the sizes of the sub-blocks #1 to #4 are less than a first threshold value, the prediction signal generation unit 242C may be configured to refer to the pixels (For example, the reference pixels X2/Y2) of the decoded blocks A to C adjacent to the processing target block T as illustrated in FIG. 11, when generating the prediction signals of all the sub-blocks #1 to #4 in the processing target block T.

On the other hand, for example, in a case where the size of the sub-block #2 is equal to or larger than the first threshold value, the prediction signal generation unit 242C may be configured to refer to the decoded pixel (For example, the reference pixel Y1) of the sub-block #1 processed immediately before as illustrated in FIG. 10, when generating the prediction signal of the sub-block #2.

Furthermore, in a case where at least one of the width and the height of the sub-block is less than the first threshold value, the prediction signal generation unit 242C may be configured to refer to the pixels (For example, the reference pixels X2/Y2) of the decoded blocks A to C adjacent to the processing target block T as illustrated in FIG. 11, when generating the prediction signals of all the sub-blocks #1 to #4 in the processing target block T.

On the other hand, for example, in a case where both the width and the height of the sub-block #2 are equal to or larger than the first threshold value, the prediction signal generation unit 242C may be configured to refer to the decoded pixel (For example, the reference pixel Y1) of the sub-block #1 processed immediately before as illustrated in FIG. 10, when generating the prediction signal of the sub-block #2.

Furthermore, in a case where the widths of the sub-blocks #1 to #4 are less than the first threshold value, the prediction signal generation unit 242C may be configured to refer to the pixels (For example, the reference pixels X2/Y2) of the decoded blocks A to C adjacent to the processing target block T as illustrated in FIG. 11 when generating the prediction signals of all the sub-blocks #1 to #4 in the processing target block T.

On the other hand, for example, in a case where the width of the sub-block #2 is equal to or larger than the first threshold value, the prediction signal generation unit 242C may be configured to refer to the decoded pixel (For example, the reference pixel Y1) of the sub-block #1 processed immediately before as illustrated in FIG. 10, when generating the prediction signal of the sub-block #2.

In this way, by switching the arrangement of the reference pixels according to the block size, for example, an increase of implementation difficulty can be prevented as the arrangement of the reference pixels that can be processed in parallel in a small sub-block, and an encoding efficiency can be improved by referring to the decoded pixel of the immediately preceding sub-block in a large sub-block.

A parallel processing technique of intra prediction is also disclosed in, for example, JP 2018-037936 A and Jiang Jie, Guo Balong, Mo Wei, and Fan Kefeng, Block-Based Parallel Intra Prediction Scheme for HEVC, Journal of Multimedia, Vol. 7, No. 4, August 2012. In these Non Patent Literatures, processing units corresponding to the sub-blocks according to the present embodiment support a case where the prediction modes are different from each other.

On the other hand, in the present embodiment, the prediction modes of the sub-blocks in the same block are common. With such a configuration, the processing of generating the prediction value is exactly the same between the case of being divided into the sub-blocks and the case of not being divided into the sub-blocks. Therefore, since it is not necessary to implement different processing with or without division, it is possible to prevent an increase in difficulty of implementation particularly in hardware.

Figure 12:
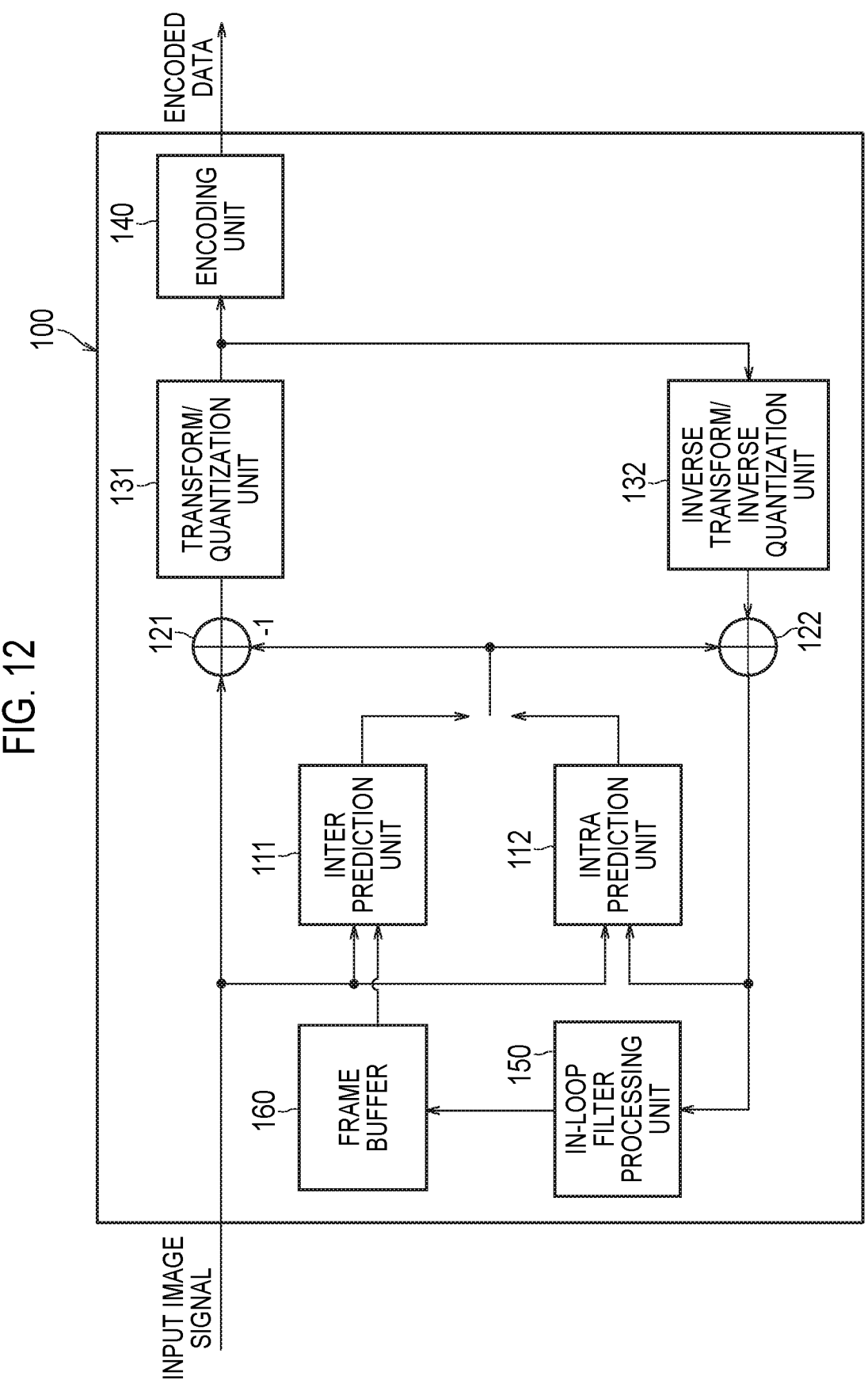
FIG. 12 is a diagram illustrating an example of functional blocks of an image encoding device 100 according to an embodiment.

Hereinafter, an image encoding device 100 according to the present embodiment will be described with reference to FIG. 12. FIG. 12 is a diagram illustrating an example of functional blocks of the image encoding device 100 according to the present embodiment.

As illustrated in FIG. 12, the image encoding device 100 includes an inter prediction unit 111, an intra prediction unit 112, a subtractor 121, an adder 122, a transform/quantization unit 131, an inverse transform/inverse quantization unit 132, an encoding unit 140, an in-loop filter processing unit 150, and a frame buffer 160.

Similarly to the inter prediction unit 241, the inter prediction unit 111 is configured to generate a prediction signal by inter prediction (inter-frame prediction).

Specifically, the inter prediction unit 111 is configured to identify a reference block included in a reference frame by comparing a frame to be encoded (Hereinafter, a target frame) with a reference frame stored in the frame buffer 160, and determine a motion vector for the identified reference block.

The inter prediction unit 111 is configured to generate a prediction signal included in the prediction block for each prediction block based on the reference block and the motion vector. The inter prediction unit 111 is configured to output the prediction signal to the subtractor 121 and the adder 122. Here, the reference frame is a frame different from the target frame.

Similarly to the intra prediction unit 242, the intra prediction unit 112 is configured to generate a prediction signal by intra prediction (intra-frame prediction).

Specifically, the intra prediction unit 112 is configured to identify a reference block included in the target frame, and generate a prediction signal for each prediction block based on the identified reference block. Furthermore, the intra prediction unit 112 is configured to output the prediction signal to the subtractor 121 and the adder 122.

Here, the reference block is a block referred to for a block to be predicted (Hereinafter, a target block). For example, the reference block is a block adjacent to the target block.

The subtractor 121 is configured to subtract the prediction signal from an input image signal, and output a prediction residual signal to the transform/quantization unit 131. Here, the subtractor 121 is configured to generate the prediction residual signal that is a difference between the prediction signal generated by intra prediction or inter prediction and the input image signal.

The adder 122 is configured to add the prediction signal to the prediction residual signal output from the inverse transform/inverse quantization unit 132 to generate a decoded signal before filter processing, and output the decoded signal before filter processing to the intra prediction unit 112 and the in-loop filter processing unit 150.

Here, the decoded signal before filter processing constitutes a reference block used by the intra prediction unit 112.

The transform/quantization unit 131 is configured to perform transform processing of the prediction residual signal and acquire a coefficient level value. Furthermore, the transform/quantization unit 131 may be configured to perform quantization of the coefficient level value.

Here, the transform processing is processing of transforming the prediction residual signal into a frequency component signal. In such transform processing, a basis pattern (transformation matrix) corresponding to discrete cosine transform (DCT) may be used, and a basis pattern (transformation matrix) corresponding to discrete sine transform (DST) may be used.

The inverse transform/inverse quantization unit 132 is configured to perform inverse transform processing of the coefficient level value output from the transform/quantization unit 131. Here, the inverse transform/inverse quantization unit 132 may be configured to perform inverse quantization of the coefficient level value prior to the inverse transform processing.

Here, the inverse transform processing and the inverse quantization are performed in a procedure opposite to the transform processing and the quantization performed by the transform/quantization unit 131.

The encoding unit 140 is configured to encode the coefficient level value output from the transform/quantization unit 131 and output an encoded data.

Here, for example, the encoding is entropy encoding that assigns codes of different lengths based on the probability of occurrence of the coefficient level value.

Furthermore, the encoding unit 140 is configured to encode a control data used in decoding processing in addition to the coefficient level value.

As described above, the control data may include a size data such as an encoded block size, a predicted block size, and a transformed block size.

Similarly to the in-loop filter processing unit 250, the in-loop filter processing unit 150 is configured to perform filter processing on the decoded signal before filter processing output from the adder 122 and output a decoded signal after filter processing to the frame buffer 160.

Here, for example, the filtering processing is deblocking filter processing for reducing distortion occurring at a boundary portion of a block (coding block, prediction block, or transform block).

The frame buffer 160 is configured to accumulate reference frames used by the inter prediction unit 111.

Here, the decoded signal after filter processing constitutes a reference frame used by the inter prediction unit 111.

Figure 13:
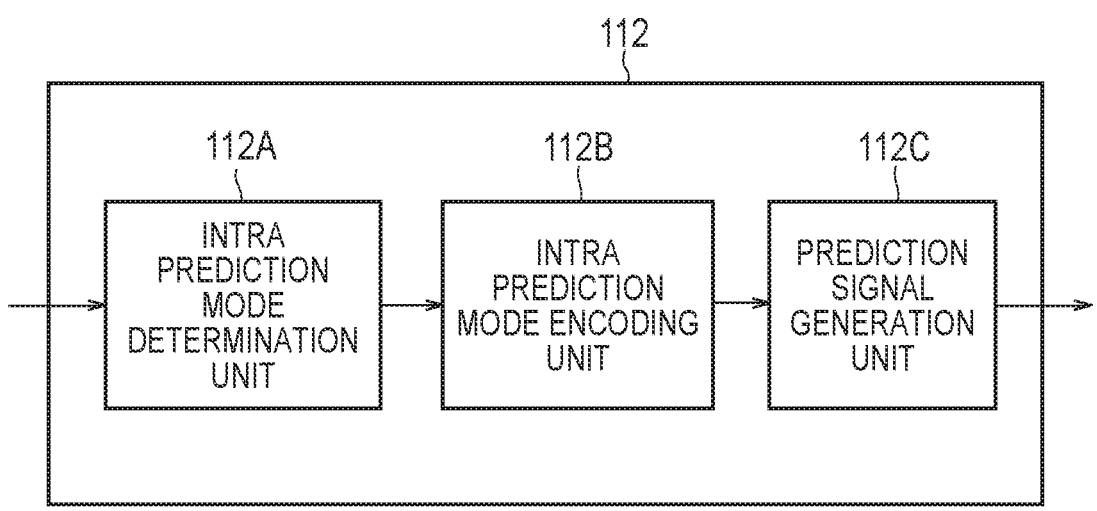
FIG. 13 is a diagram illustrating an example of functional blocks of an intra prediction unit 112 of an image encoding device 100 according to an embodiment.

Hereinafter, an intra prediction unit 112 according to the present embodiment will be described with reference to FIG. 13. FIG. 13 is a diagram illustrating an example of functional blocks of the intra prediction unit 112 of the image encoding device 100 according to the present embodiment.

As illustrated in FIG. 13, the intra prediction unit 112 includes an intra prediction mode determination unit 112A, an intra prediction mode encoding unit 112B, and a prediction signal generation unit 112C.

The intra prediction unit 112 is an example of a prediction unit configured to generate a prediction signal by intra prediction (intra-frame prediction).

The intra prediction mode determination unit 112A is configured to make a determination of information to be encoded by the intra prediction mode encoding unit 112B in a subsequent stage, such as an intra prediction mode of the block and whether or not the ISP is applied. Since a known method can be used as a method of the determination, details thereof are omitted.

The intra prediction mode encoding unit 112B is configured to encode the prediction mode of the target block. The processing content is similar to that of the intra prediction mode decoding unit 242B. Specifically, for example, the processing is processing in which the portion "decoding" in the processing flowchart of the intra prediction mode decoding unit 242B illustrated in FIG. 4 is changed to "encoding".

The prediction signal generation unit 112C is configured to generate the prediction signal of the block according to the prediction mode encoded by the intra prediction mode encoding unit 112B. The generation method of the prediction signal is the same as that of the prediction signal generation unit 242C.

According to the image processing system 1 of the present embodiment, even in the block to which the ISP is applied, the pixel of the adjacent block that has already been encoded (decoded) can be referred to in the intra prediction, so that the processing of each sub-block can be executed in parallel, and the number of cycles required for the processing of one block in hardware can be reduced.

The foregoing image encoding device 100 and the image decoding device 200 may also be realized by a program that causes a computer to perform each function (each process).

Note that, in each of the foregoing embodiments, the present invention has been described by taking application to the image encoding device 100 and the image decoding device 200 by way of an example; however, the present invention is not limited only to such devices and can be similarly applied to encoding/decoding systems provided with each of the functions of an encoding device and a decoding device.

What is claimed is:

1. An image decoding device comprising:
   a prediction signal generation unit that generates a prediction signal by intra prediction, wherein
   in a block to which intra sub-partitions are applied, the prediction signal generation unit refers to a pixel of a decoded block adjacent to the block when generating prediction signals of all sub-blocks in the block, in a case where sizes of the sub-blocks are less than a first threshold value.

2. An image decoding method comprising:
   generating a prediction signal by intra prediction, wherein
   in the generating, in a block to which intra sub-partitions are applied, a pixel of a decoded block adjacent to the block is referred to, when generating prediction signals of all sub-blocks in the block, in a case where sizes of the sub-blocks are less than a first threshold value.

3. A non-transitory computer readable medium with instructions thereon that when executed by a processor of an image decoding device, cause the processor to execute:
   generating a prediction signal by intra prediction, wherein
   in the generating, in a block to which intra sub-partitions are applied, a pixel of a decoded block adjacent to the block is referred to when generating prediction signals of all sub-blocks in the block, in a case where sizes of the sub-blocks are less than a first threshold value.

* * * * *